United States Patent
Kitao et al.

(10) Patent No.: US 7,635,542 B2
(45) Date of Patent: Dec. 22, 2009

(54) NON-AQUEOUS ELECTROLYTE SECONDARY BATTERY

(75) Inventors: Hideki Kitao, Sakaiminato (JP); Takanobu Chiga, Kobe (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 27 days.

(21) Appl. No.: 11/866,774

(22) Filed: Oct. 3, 2007

(65) Prior Publication Data

US 2008/0081262 A1   Apr. 3, 2008

(30) Foreign Application Priority Data

Oct. 3, 2006   (JP) .............................. 2006-271573

(51) Int. Cl.
*H01M 10/40*   (2006.01)

(52) U.S. Cl. ...................... 429/331; 429/347; 429/206

(58) Field of Classification Search .............. 429/218.1, 429/231.95, 231.8, 331, 321, 322, 324, 326, 429/330, 188, 231.4, 347, 206
See application file for complete search history.

(56) References Cited

U.S. PATENT DOCUMENTS

| | | | |
|---|---|---|---|
| 7,459,237 B2 * | 12/2008 | Totir et al. | 429/224 |
| 2002/0197534 A1 * | 12/2002 | Fukuda et al. | 429/231.4 |
| 2005/0233222 A1 | 10/2005 | Yanagida et al. | |
| 2006/0177737 A1 * | 8/2006 | Tode et al. | 429/231.1 |

FOREIGN PATENT DOCUMENTS

| | | |
|---|---|---|
| JP | 5121066 A | 5/1993 |
| JP | 9237638 A | 9/1997 |
| JP | 9326253 A | 12/1997 |
| JP | 2005259592 A | 9/2005 |

* cited by examiner

*Primary Examiner*—Patrick Ryan
*Assistant Examiner*—Monique Wills
(74) *Attorney, Agent, or Firm*—Westerman, Hattori, Daniels & Adrian, LLP

(57) ABSTRACT

A non-aqueous electrolyte secondary battery includes a positive electrode, a negative electrode, and a non-aqueous electrolyte comprising an electrolyte dissolved in a non-aqueous solvent. The negative electrode uses a low crystalline carbon coated graphite in which at least part of the surface of graphite is coated with a low crystalline carbon material having lower crystallinity than that of graphite as a negative electrode active material, and the non-aqueous electrolyte comprises a lithium salt which has oxalate complex as an anion, in addition to a mixed solvent of propylene carbonate and chain carbonate as a non-aqueous solvent.

5 Claims, 4 Drawing Sheets

NON-AQUEOUS ELECTROLYTE SECONDARY BATTERY

RELATED APPLICATION

This application is based on application No. 2006-271573 filed in Japan, the contents of which are hereby incorporated by reference.

BACKGROUND OF THE INVENTION

1. Field of the Invention

The present invention relates to a non-aqueous electrolyte secondary battery employing a positive electrode, a negative electrode, and a non-aqueous electrolyte comprising an electrolyte dissolved in a non-aqueous solvent. More particularly, the invention relates to a non-aqueous electrolyte secondary battery employing a negative electrode using graphite as a negative electrode active material and a non-aqueous electrolyte using a non-aqueous solvent containing propylene carbonate, which is characterized in that reaction between propylene carbonate and the graphite of the negative electrode active material is restricted so that excellent charge/discharge cycle performances can be attained.

2. Description of the Related Art

Conventionally, as one of advanced secondary batteries featuring high power and high energy density, non-aqueous electrolyte secondary batteries employing non-aqueous electrolytes wherein lithium ion is moved between their positive electrodes and negative electrodes to perform charging and discharging have been commonly used.

Further, recently, such non-aqueous electrolyte secondary batteries have been under consideration for utilizing in various fields, such as a power source of electric automobiles.

As the non-aqueous electrolyte secondary batteries have been utilized in various fields, such as the power source of electric automobiles, demands for higher power performance under low temperature conditions and higher preservation durability under high temperature conditions have been increasing.

In the non-aqueous electrolyte secondary batteries, propylene carbonate having a lower melting point than that of ethylene carbonate has been used as a non-aqueous solvent of the non-aqueous electrolytes for improving power performance under low temperature conditions.

However, these non-aqueous electrolyte secondary batteries employing propylene carbonate as the non-aqueous solvent of the non-aqueous electrolytes have a problem as follows. When graphite having a high charge/discharge efficiency and a high energy density is used as a negative electrode active material in the negative electrodes, propylene carbonate reacts with the graphite and decomposes, resulting in drawbacks that the charge/discharge efficiency and so on of the non-aqueous electrolyte secondary batteries are lowered and sufficient battery performances are so difficult to be obtained.

Therefore, in recent years, in order to prevent propylene carbonate from reacting and decomposing, there has been many proposals to use low crystalline carbon coated graphite wherein the surface of graphite is coated with a low crystalline carbon material having lower crystallinity than that of graphite, as the negative electrode active material (see, Japanese Publication Nos. 5-121066, 9-237638, and 9-326253).

Nevertheless, a problem in using the low crystalline carbon coated graphite wherein the surface of graphite is coated with the low crystalline carbon material having lower crystallinity than that of graphite as the negative electrode active material, has been that, because a volume change of the graphite during charge/discharge cycling is different from that of the low crystalline carbon coating its surface, the low crystalline carbon coating the surface is peeled off the graphite and propylene carbonate reacts with thus exposed graphite and decomposes in the case of long repeated charge/discharge cycling or charging/discharging under high temperature conditions, so that sufficient charge/discharge cycle performances are so difficult to be obtained.

SUMMARY OF THE INVENTION

An object of the present invention is, in a non-aqueous electrolyte secondary battery employing a non-aqueous electrolyte comprising propylene carbonate as a non-aqueous solvent, that when low crystalline carbon coated graphite wherein at least part of the surface of graphite is coated with a low crystalline carbon material having lower crystallinity than that of graphite is used as a negative electrode active material, peeling of the low crystalline carbon off the graphite during charge/discharge cycling is prevented, so that excellent charge/discharge cycle performances can be obtained.

A non-aqueous electrolyte secondary battery of the present invention comprises: a positive electrode; a negative electrode; and a non-aqueous electrolyte comprising an electrolyte dissolved in a non-aqueous solvent; wherein said negative electrode uses low crystalline carbon coated graphite in which at least part of the surface of graphite is coated with a low crystalline carbon material having lower crystallinity than that of graphite as a negative electrode active material, and said non-aqueous electrolyte comprises a mixed solvent of propylene carbonate and chain carbonate as a non-aqueous solvent, and a lithium salt which has oxalate complex as an anion.

In the present invention, natural graphite or artificial graphite may be used as the graphite of the low crystalline carbon coated graphite used as the negative electrode material in the non-aqueous electrolyte secondary battery. In order to coat the surface of the graphite with the low crystalline carbon, a dry process, a wet process, a liquid phase method, a gas phase method, or a partial gas phase method may be used.

As the foregoing low crystalline carbon coated graphite, it is preferable to use low crystalline carbon coated graphite having an intensity ratio IA/IB in the range of 0.2 to 0.3, where IA is the peak intensity of 1350/cm and IB is the peak intensity of 1580/cm, determined using Raman spectral method. It is noted here that the peak intensity of 1580/cm determined is a peak assigned to a stacking structure having a hexagonal symmetry resemblant to graphite structure. In contrast, the peak intensity of 1350/cm is a peak assigned to a low crystalline structure wherein carbon crystal is disturbed. As the value of IA/IB is great, a low crystalline carbon portion on the surface of the graphite is increased. If the value of IA/IB is less than 0.2, the low crystalline carbon portion on the surface of the graphite is decreased, so that sufficient improvement in acceptability of lithium ion is difficult. On the other hand, if the value of IA/IB is over 0.3, the low crystalline carbon portion is increased, while a graphite portion is decreased, causing a decrease of battery capacity. Therefore, as mentioned above, it is preferable to use the low crystalline carbon coated graphite having the intensity ratio IA/IB in the range of 0.2 to 0.3.

In the non-aqueous electrolyte secondary battery of the present invention, a preferred chain carbonate to be mixed with propylene carbonate used for the non-aqueous solvent of the non-aqueous electrolyte may be chain carbonate which enhances perviousness of the non-aqueous electrolyte to the positive electrode and the negative electrode. Examples of such a preferred chain carbonate include diethyl carbonate (DEC), dimethyl carbonate (DMC), ethyl methyl carbonate (EMC) and the like. These chain carbonates may be used alone or in combination of two or more. Further, it is particularly preferred to admix vinylene carbonate (VC) or vinyl ethylene carbonate (VEC) to the non-aqueous solvent of the non-aqueous electrolyte for the purpose of enhancing cycle performances of the non-aqueous electrolyte secondary battery.

As the electrolyte to be dissolved in the non-aqueous solvent of the non-aqueous electrolyte, known electrolytes generally used in non-aqueous electrolyte secondary batteries may be used. Examples of an usable electrolyte include $LiPF_6$, $LiBF_4$, $LiCF_3SO_3$, $LiN(CF_3SO_2)_2$, $LiN(C_2F_6SO_2)_2$, $LiN(CF_3SO_2)(C_4F_9SO_2)$, $LiC(C_2F_5SO_2)_3$, $LiAsF_6$, $LiClO_4$ and the like. These electrolytes may be used alone or in combination of two or more.

As the lithium salt which has oxalate complex as the anion contained in the non-aqueous electrolyte, a lithium salt represented by the chemical formula 1 below may be used. To be concrete, examples of an usable lithium salt include lithium-bis(oxalate) borate, difluoro(oxalate) lithium borate, tetrafluoro(oxalate) lithium phosphate, and the like. Particularly, it is preferable to use lithium-bis(oxalate) borate for the purpose of enhancing the cycle performances.

[Chemical Formula 1]

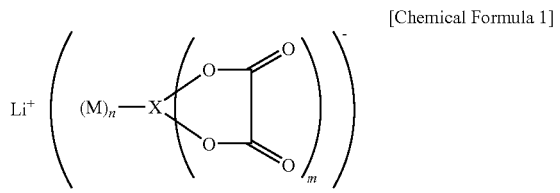

In the formula, X is an element selected from among transition metals, group IIIA elements, group IV elements and group V elements in periodic table, M is halogen element, and n is in the range of 0 to 4 and m is in the range of 1 to 2.

In the non-aqueous electrolyte secondary battery of the present invention, as the positive electrode active material used in the positive electrode, known positive electrode active materials generally used in non-aqueous electrolyte secondary batteries may be used. Examples of an usable positive electrode active material include lithium-transition metal composite oxide, such as, lithium cobaltate ($LiCoO_2$), lithium manganate ($LiMn_2O_4$), lithium nickelate ($LiNiO_2$) and the like, and phosphate containing lithium, such as, $LiFePO_4$ and the like. Further, a lithium-transition metal composite oxide in which part of transition metal is substituted by another metal elements may be used. Examples of an usable metal element for the substitution include cobalt (Co), nickel (Ni), vanadium (V), manganese (Mn), zirconium (Zr), titanium (Ti), zinc (Zn), aluminum (Al), iron (Fe), niobium (Nb), and molybdenum (Mo). These metal elements may be used alone or in combination of two or more, for example, a lithium-transition metal composite oxide containing Ni, Co and Mn may be used. Further, a mixture of the foregoing materials may be used as the positive electrode active material.

In the non-aqueous electrolyte secondary battery of the present invention, a positive electrode mixture wherein a conductive agent, such as carbon material, or a binding agent is added to the foregoing positive electrode active material may be used for fabrication of the positive electrode.

Further, when the carbon material as the conductive agent is added to the positive electrode mixture, it is preferable to set an amount of the carbon material contained in the positive electrode mixture in the range of 3 to 15 wt %. Further, a total amount of the conductive agent and the binding agent contained in the positive electrode mixture may be preferably set in the range of 10 wt % or less, from the viewpoint of ensuring energy density. Examples of an usable carbon material to be used as the conductive agent include aggregated carbon, such as acetylene black, fibrous carbon and the like.

According to the non-aqueous electrolyte secondary battery of the present invention, the low crystalline carbon coated graphite wherein at least part of the surface of graphite is coated with a low crystalline carbon material having a lower crystallinity than that of graphite is used as the negative electrode active material of the negative electrode, so that the graphite of the low crystalline carbon coated graphite contributes to an achievement of sufficient high energy density, and the low crystalline carbon material covering the graphite prevents the graphite and the non-aqueous electrolyte from contacting and reacting.

Further, according to the non-aqueous electrolyte secondary battery of the present invention, the mixed solvent of propylene carbonate and the chain carbonate is used as the non-aqueous solvent of the non-aqueous electrolyte, so that propylene carbonate contributes to enhancement of power performance under low temperature conditions, and the chain carbonate contributes to enhancement of perviousness of the non-aqueous electrolyte to the positive electrode and the negative electrode. As a result, the non-aqueous electrolyte secondary battery can decrease the inner resistance and achieve excellent charge/discharge performances.

Still further, according to the non-aqueous electrolyte secondary battery of the present invention, the lithium salt which has oxalate complex as the anion is contained in the non-aqueous electrolyte, so that said lithium salt which has oxalate complex as the anion is solvated with propylene carbonate, and a formed material which is formed by a decomposition occurred on the surface of the negative electrode active material has a function as adhesive polymer. This formed material prevents the low crystalline carbon material from peeling off the surface of the graphite, and makes it possible to suppress decrease of the battery capacity occurring in the case of repeated charge/discharge cycling or in the case of charging/discharging under high temperature conditions. Thus, excellent charge/discharge cycle performances can be achieved.

These and other objects, advantages and features of the invention will become apparent from the following description thereof taken in conjunction with the accompanying drawing which illustrates specific embodiment of the invention.

DESCRIPTION OF THE PREFERRED EMBODIMENTS

Hereinafter, preferred embodiments of non-aqueous electrolyte secondary batteries according to the present invention will specifically be described. It is to be noted that the non-aqueous electrolyte secondary batteries according to the present invention should not be limited to the following examples thereof and suitable changes and modifications may be made thereto within the scope of the invention.

Example 1

Figure 1:
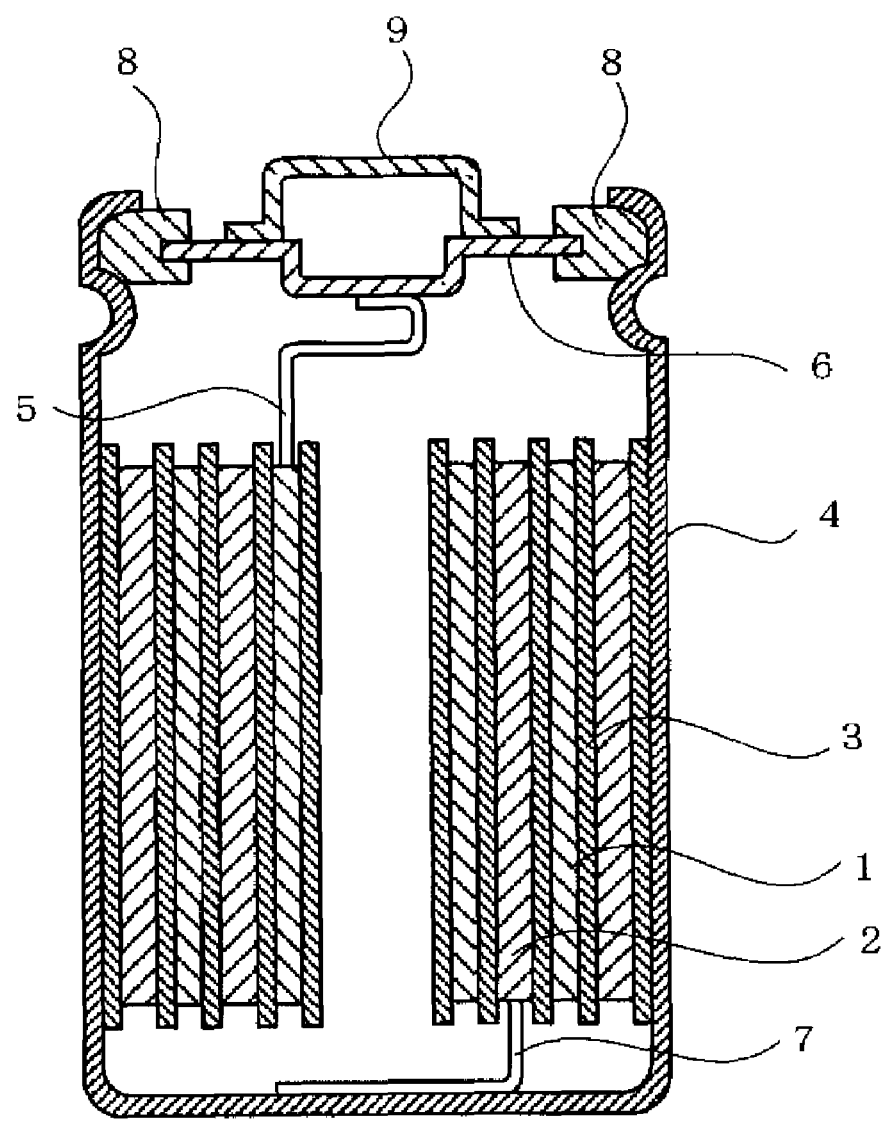
FIG. 1 is a schematic cross-sectional view illustrating a non-aqueous electrolyte secondary battery, fabricated in Example 1 and Comparative Examples 1 to 5 of the present invention.

In Example 1, a non-aqueous electrolyte secondary battery employing a positive electrode, a negative electrode and a non-aqueous electrolyte fabricated in the following manner, which was a cylindrical shape as illustrated in FIG. 1, having a battery capacity of 1200 mAh, was fabricated.

Preparation of Positive Electrode $Li(Ni_{0.4}Co_{0.3}Mn_{0.3})_{0.995}Zr_{0.005}O_2$ as a positive electrode active material, a carbon material as a conductive agent, and N-methyl-2-pyrolidone solution dissolving polyvinylidene fluoride as a binding agent were kneaded adjusting a weight ratio of the positive electrode active material, the conductive agent and the binding agent to be in 90:5:5. Thus was obtained positive electrode mixture slurry.

Next, the positive electrode mixture slurry was applied on a collector formed of aluminum foil, dried, and rolled by a rolling roller, and a collector tab was installed thereto. Thus was obtained a positive electrode.

Preparation of Negative Electrode

As a negative electrode active material, low crystalline carbon coated graphite wherein the surface of graphite particle is coated with a low crystalline carbon material having lower crystallinity than that of graphite was used. The low crystalline carbon coated graphite had an intensity ratio (IA/IB) of 0.22, where IA is the peak intensity of 1350/cm and IB is the peak intensity of 1580/cm determined by Raman Spectroscopy using a Ar-laser.

Next, the foregoing negative electrode active material comprising the low crystalline carbon coated graphite, styrene-butadiene rubber (SBR) as a binding agent and an aqueous solution dissolving carboxymethyl cellulose as a viscosity improver were kneaded adjusting a weight ratio of the negative electrode active material, the binding agent and the viscosity improver to be in 98:1:1. Thus was obtained negative electrode mixture slurry.

Then, the negative electrode mixture slurry was applied on a collector formed of copper foil, dried, and rolled by a rolling roller, and a collector tab was installed thereto. Thus was obtained a negative electrode.

Preparation of Non-Aqueous Electrolyte

Propylene carbonate and ethyl methyl carbonate which is chain carbonate were mixed in a volume ratio of 1:2 to prepare a mixed solvent as a non-aqueous solvent. In the mixed solvent, $LiPF_6$ which is an electrolyte was dissolved in a concentration of 1 mol/l, lithium-bis(oxalate)borate $Li[B(C_2O_4)_2]$ as a lithium salt which has oxalate complex as an anion, was dissolved in a concentration of 0.1 mol/l, and 1 wt % of vinylene carbonate (VC) was further dissolved. Thus was obtained a non-aqueous electrolyte.

Fabrication of Battery

A battery was fabricated in the following manner. A separator 3 formed of a lithium-ion-transmittable porous polyethylene film was interposed between a positive electrode 1 and a negative electrode 2 prepared in the above-mentioned manners, as shown in FIG. 1, and they were contained in a battery can 4 upon being spirally wound after which the non-aqueous electrolyte prepared in the above-mentioned manner was poured in the battery can 4 and the battery can 4 was sealed, and the positive electrode 1 was connected to an external terminal 9 attached to a positive-electrode cover 6 through a positive electrode tab 5 and the negative electrode 2 was connected to the battery can 4 through a negative electrode tab 7, to electrically separate the battery can 4 and the positive electrode cover 6 from each other by an insulating packing 8.

Comparative Example 1

In Comparative Example 1, a non-aqueous electrolyte was prepared by not dissolving lithium-bis(oxalate)borate $Li[B(C_2O_4)_2]$ in the mixed solvent. Except for the above, the same procedure as that in Example 1 was used to fabricate a non-aqueous electrolyte secondary battery of Comparative Example 1.

Comparative Example 2

In Comparative Example 2, a non-aqueous electrolyte was prepared by using a mixed solvent wherein propylene carbonate and ethylene carbonate which is a cyclic carbonate were mixed in a volume ratio of 3:7 as a non-aqueous solvent. Except for the above, the same procedure as that in Example 1 was used to fabricate a non-aqueous electrolyte secondary battery of Comparative Example 2.

Comparative Example 3

In Comparative Example 3, a non-aqueous electrolyte was prepared by using a mixed solvent wherein propylene carbonate and ethylene carbonate which is a cyclic carbonate were mixed in a volume ratio of 5:5 as a non-aqueous solvent. Except for the above, the same procedure as that in Example 1 was used to fabricate a non-aqueous electrolyte secondary battery of Comparative Example 3.

Comparative Example 4

In Comparative Example 4, a non-aqueous electrolyte was prepared by using a mixed solvent wherein propylene carbonate and ethylene carbonate which is a cyclic carbonate were mixed in a volume ratio of 7:3 as a non-aqueous solvent. Except for the above, the same procedure as that in Example 1 was used to fabricate a non-aqueous electrolyte secondary battery of Comparative Example 4.

Comparative Example 5

In Comparative Example 5, a non-aqueous electrolyte was prepared by using only propylene carbonate as a non-aqueous solvent. Except for the above, the same procedure as that in Example 1 was used to fabricate a non-aqueous electrolyte secondary battery of Comparative Example 5.

Figure 2:
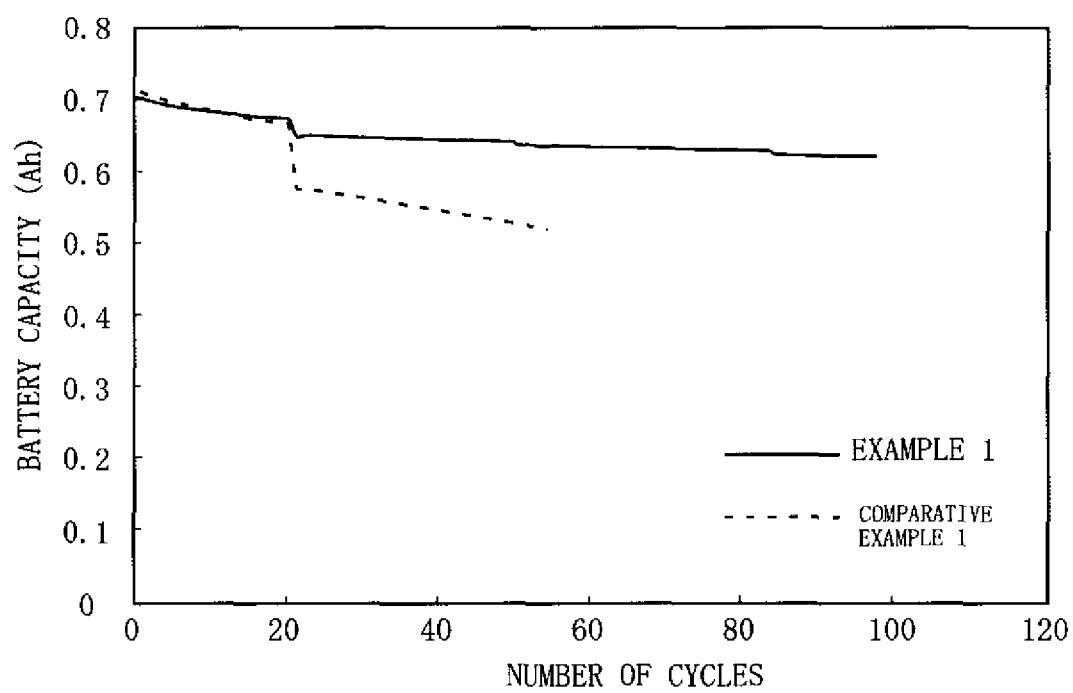
FIG. 2 is a graph illustrating cycle performances of the non-aqueous electrolyte secondary batteries of Example 1 and Comparative Example 1 in the case of charge/discharge cycling.

Next, each of the non-aqueous electrolyte secondary batteries of Example 1 and Comparative Example 1 was charged at a constant current of 1400 mA to the voltage of 4.2 V, and was discharged at the constant current of 1400 mA to the voltage of 2.4 V in a homothermal container of which temperature was 25° C. This charge-discharge cycle was repeated 20 times. Then, the above mentioned charge-discharge cycle was repeated in the condition that the temperature of the homothermal container was risen to 60° C. so as to find a relationship between the number of cycles and the battery capacity. The results were shown in FIG. 2. Further, each battery capacity at the twentieth cycle, the twenty-first cycle and the fiftieth cycle were shown in Table 1 below. As to the non-aqueous electrolyte secondary batteries of Comparative Examples 2 to 5 wherein propylene carbonate and ethylene carbonate of cyclic carbonate were used as the non-aqueous solvent, it was impossible to conduct charge/discharge cycling because of high internal resistances.

TABLE 1

| | $Li[B(C_2O_4)_2]$ in non-aqueous electrolyte | Battery capacity at number of cycle (Ah) | | |
|---|---|---|---|---|
| | | 20th cycle | 21st cycle | 50th cycle |
| Example 1 | ○ | 0.67 | 0.66 | 0.65 |
| Comparative | X | 0.66 | 0.57 | 0.52 |

The results demonstrate that the non-aqueous electrolyte secondary battery of Comparative Example 1 employing the non-aqueous electrolyte wherein lithium-bis(oxalate)borate $Li[B(C_2O_4)_2]$ was not dissolved, exhibited a great decrease in the battery capacity at the twenty-first cycle under the charge/discharge cycling in the homothermal container having the temperature of 60° C. compared with the battery capacity at the twentieth cycle under the charge/discharge cycling in the homothermal container having the temperature of 25° C.

In contrast, as to the non-aqueous electrolyte secondary battery of Example 1 employing the non-aqueous electrolyte wherein lithium-bis(oxalate)borate $Li[B (C_2O_4)_2]$ was dissolved, a decrease in the battery capacity at the twenty-first cycle under the charge/discharge cycling in the homothermal container having the temperature of 60° C. compared with the twentieth cycle under the charge/discharge cycling in the homothermal container having the temperature of 25° C., was more suppressed, so that repeated charge/discharge cycling can be conducted stably for a long time.

Comparative Example 6

In Comparative Example 6, a negative electrode was prepared by using graphite particle which was not coated with the low crystalline carbon material, instead of the low crystalline carbon coated graphite. Except for the above, the same procedure as that in Example 1 was used to prepare a non-aqueous electrolyte secondary battery of Comparative Example 6. The graphite particle used in Comparative Example 6 had an intensity ratio (IA/IS) of 0.16, where IA is the peak intensity of 1350/cm and IS is the peak intensity of 1580/cm determined by Raman Spectroscopy using a Ar-laser.

Figure 3:
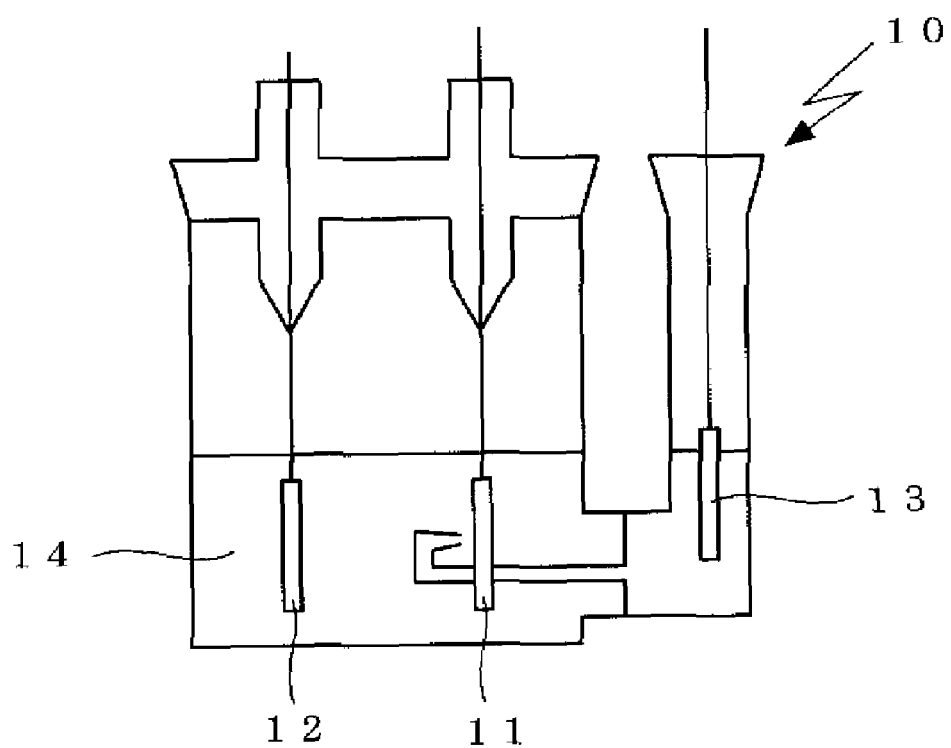
FIG. 3 is a schematic view illustrating a test cell using a negative electrode fabricated in Example 1 and Comparative Example 6.

Further, each of the negative electrode of Example 1 and the negative electrode of Comparative Example 1, each of which has a size of 0.57 cm$^2$, was used as a working electrode 11 to fabricate a test cell 10 as shown in FIG. 3.

In the test cell 10, the non-aqueous electrolyte prepared in Example 1 was used as a non-aqueous electrolyte 14, and lithium metal was utilized for each of a counter electrode 12 and a reference electrode 13.

Figure 4:
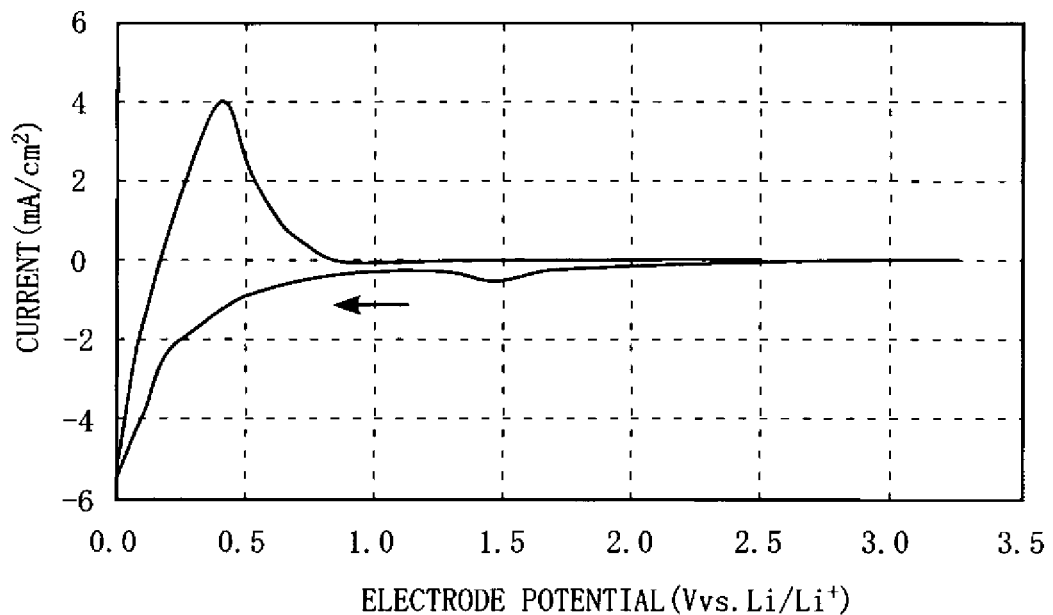
FIG. 4 is a graph illustrating the result of cyclic voltammetry measurement for the test cell using the negative electrode fabricated in Example 1.
Figure 5:
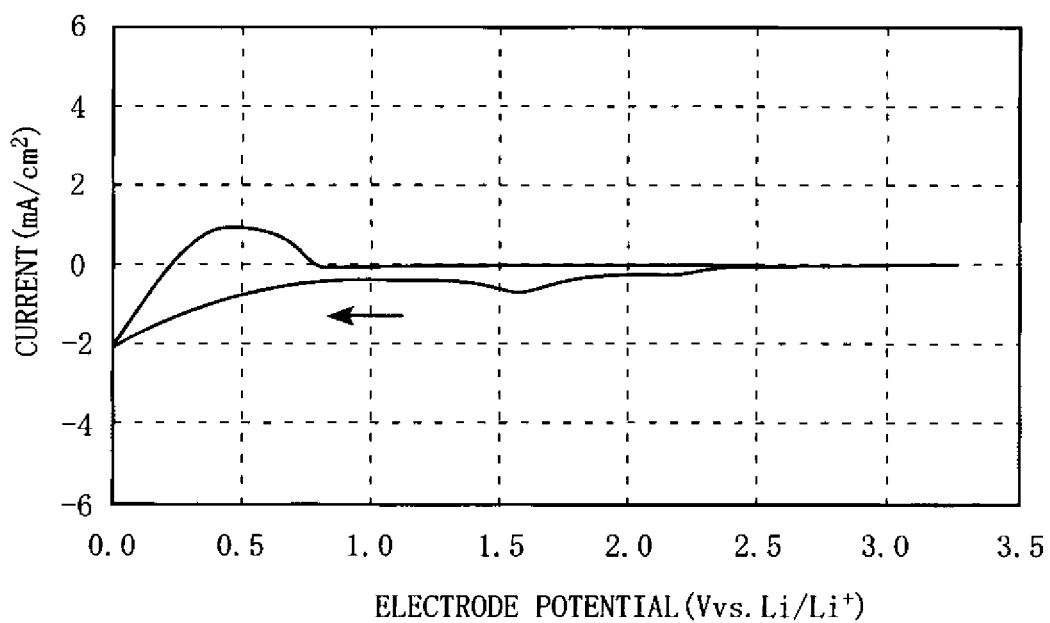
FIG. 5 is a graph illustrating the result of cyclic voltammetry measurement for the test cell using the negative electrode fabricated in Comparative Example 6.

Each test cell was subjected to cyclic voltammetry measurement, under measuring conditions that the electrode potential was in the range of 0 to 2.5 V (vs. Li/Li$^+$) and a scan speed was 1 mV/sec. The result of the test cell employing the negative electrode of Example 1 was shown in FIG. 4, and the result of the test cell employing the negative electrode of Comparative Example 6 was shown in FIG. 5.

The results demonstrate that the test cell employing the negative electrode of Comparative Example 6 using the graphite particle which was not coated with the low crystalline carbon material, exhibited a lower oxidation-reduction current compared with the test cell employing the negative electrode of Example 1 using the low crystalline carbon coated graphite. This means the test cell employing the negative electrode of Comparative Example 6 can not attain a sufficient battery capacity. In addition, the test cell employing the negative electrode of Comparative Example 6 exhibited a poorer reversibility of oxidation-reduction in the case of repeated measurements, so that the battery capacity was rapidly lowered.

These results suggest that in the case of dissolving the lithium salt which has oxalate complex as the anion in addition to the mixed solvent of propylene carbonate and chain carbonate as the non-aqueous solvent in the non-aqueous electrolyte, the non-aqueous electrolyte secondary battery using the low crystalline carbon coated graphite as the negative electrode active material can attain a higher battery capacity and more improved charge/discharge cycle performances compared with the non-aqueous electrolyte secondary battery using the graphite particle which was not coated with the low crystalline carbon material.

Although the present invention has been fully described by way of examples, it is to be noted that various changes and modification will be apparent to those skilled in the art.

Therefore, unless otherwise such changes and modifications depart from the scope of the present invention, they should be constructed as being included therein.

The invention claimed is:

1. A non-aqueous electrolyte secondary battery comprising a positive electrode, a negative electrode, and a non-aqueous electrolyte comprising an electrolyte dissolved in a non-aqueous solvent, said negative electrode using a low crystalline carbon coated graphite wherein at least part of the surface of graphite is coated with a low crystalline carbon material having lower crystallinity than that of graphite as a negative electrode active material, and said non-aqueous electrolyte comprising a mixed solvent of propylene carbonate and chain carbonate as a non-aqueous solvent, and a lithium salt which has oxalate complex as an anion;

wherein said lithium salt which has oxalate complex as the anion is at least one lithium salt selected from a group of difluoro(oxalate) lithium borate and tetrafluoro(oxalate) lithium phosphate.

2. The non-aqueous electrolyte secondary battery according to claim 1, wherein at least one of vinylene carbonate and vinyl ethylene carbonate is admixed to the non-aqueous solvent of the non-aqueous electrolyte.

3. The non-aqueous electrolyte secondary battery according to claim 2, wherein vinylene carbonate is admixed to the non-aqueous solvent of the non-aqueous electrolyte.

4. The non-aqueous electrolyte secondary battery according to claim 1, wherein said positive electrode active material of the positive electrode is a lithium-transition metal composite oxide containing Ni, Co and Mn.

5. The non-aqueous electrolyte secondary battery according to claim 1, wherein the positive electrode active material of the positive electrode is $Li(Ni_{0.4}Co_{0.3}Mn_{0.3})_{0.995}Zr_{0.05}O_2$.

* * * * *